United States Patent [19]

Insolio

[11] 4,098,156
[45] Jul. 4, 1978

[54] GLASS CUTTER WITH LONG AXLE AND RETAINER HOLDER

[75] Inventor: Thomas A. Insolio, Bristol, Conn.

[73] Assignee: The Fletcher-Terry Company, Farmington, Conn.

[21] Appl. No.: 797,003

[22] Filed: May 16, 1977

[51] Int. Cl.² .............................................. B26D 3/08
[52] U.S. Cl. ...................................... 83/12; 30/164.95
[58] Field of Search ......................... 83/6, 7, 8, 11, 12; 30/164.95

[56] References Cited

U.S. PATENT DOCUMENTS

| | | | |
|---|---|---|---|
| 2,096,284 | 10/1937 | Lee ..................................... | 30/164.95 |
| 3,373,488 | 3/1968 | Fletcher ............................. | 30/164.95 |
| 3,570,336 | 3/1971 | Galla ........................................ | 83/12 |
| 3,682,027 | 8/1972 | Insolio et al. ............................ | 83/12 |
| 3,850,062 | 11/1974 | Insolio ..................................... | 83/12 |

*Primary Examiner*—J. M. Meister
*Attorney, Agent, or Firm*—McCormick, Paulding & Huber

[57] ABSTRACT

Two holders are disclosed, one with a downwardly removable retainer, the other with a forwardly removable retainer. The retainer in each case is U-shaped and has aligned openings to receive the long axle. The retainer is so mounted in the holder that an axle slot, oriented perpendicularly to the slot for the retainer, assists in supporting the retainer and cutter wheel axle. Pins extend across the axle slot to further support the axle, cutter and retainer in the holder.

10 Claims, 11 Drawing Figures

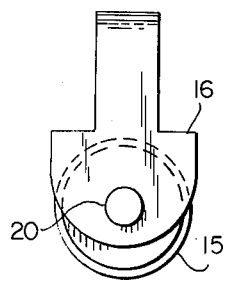
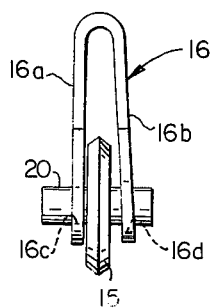
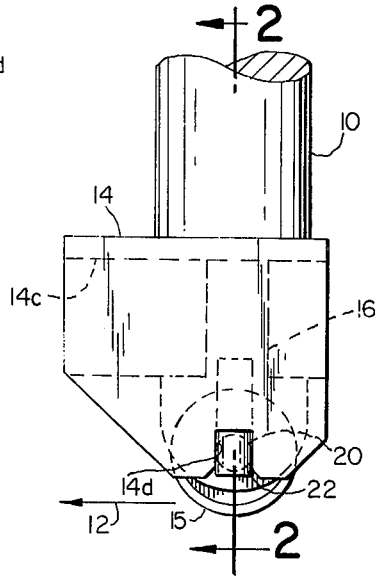
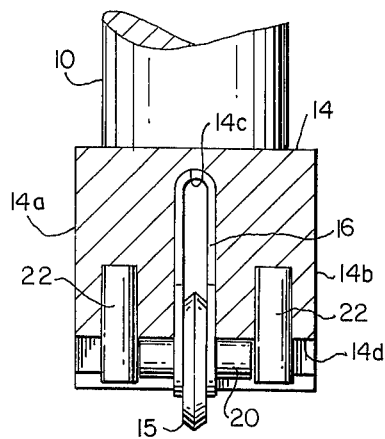
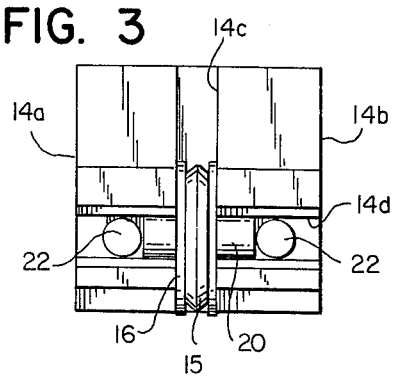

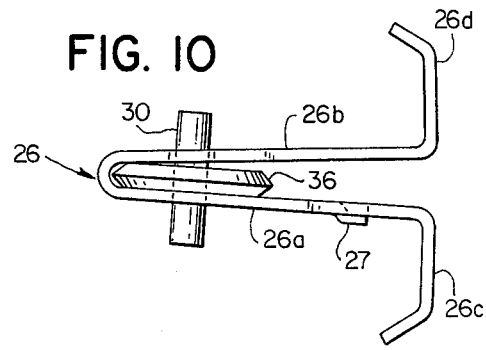
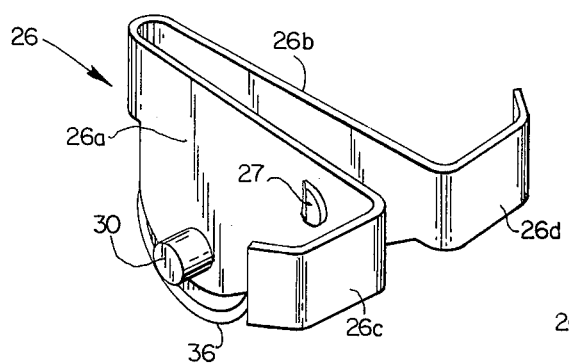
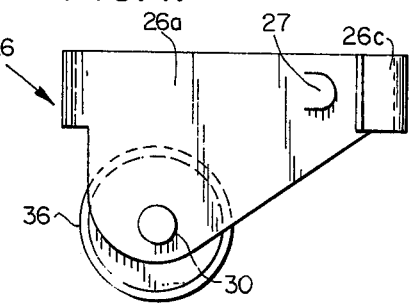
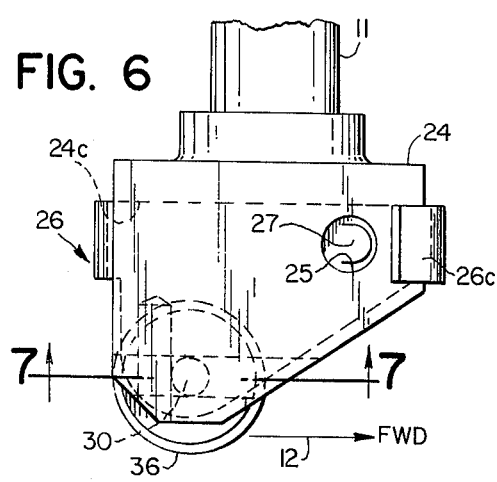
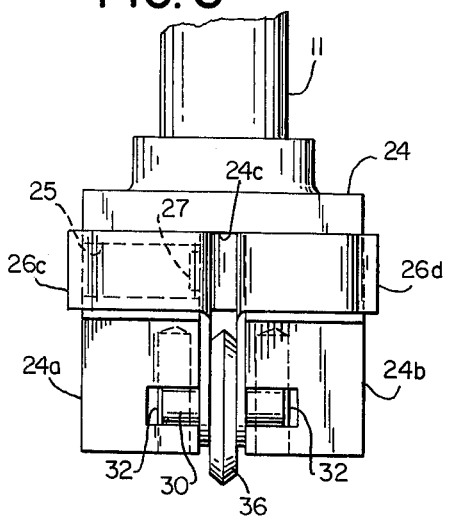
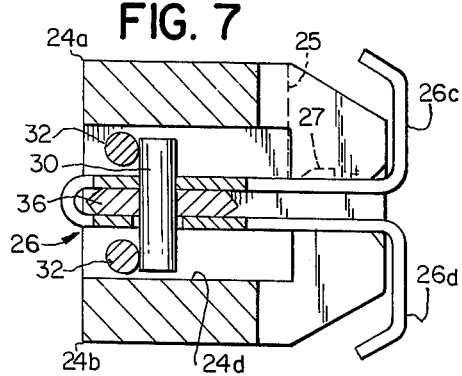

GLASS CUTTER WITH LONG AXLE AND RETAINER HOLDER

BACKGROUND OF THE INVENTION

Prior art glass cutting heads, of the type adapted for use in a machine wherein the head is movable relative to the glass sheet are generally of two types. The most common type is exemplified by that shown in U.S. Pat. No. 3,373,488 wherein a spring clip retainer supports the cutting wheel for rotation on an axle which is mounted in the legs of the retainer. The retainer is mounted in a holder so that the wheel trails the center line, or axis of the holder. The spring clip type of retainer has the advantage of being more easily removed for replacement or repair thatn the older cylindrical plug or insert exemplified by that shown in Gerew et al., U.S. Pat. No. 3,461,755. In the latter disclosure, the holder defines a bore which slidably receives the plug, and means is provided for retaining the plug in its holder. The prior art shows plugs, or inserts other than cylindrical, as for example in my prior U.S. Pat. No. 3,682,027 wherein a rectangular insert is provided for horizontal removal from its associated holder. These plugs or insert type glass cutter holders have advantages over the clip or retainer type in that the cutting wheel is more rigidly supported for more precise cutting over a longer period of use than is true of the retainer type.

The chief aim of the present invention is to provide an improved glass cutter holder wherein the wheel and axle are supported for precise cutting but in a retainer which can be readily removed for replacement or repair of the cutting tool.

SUMMARY OF THE INVENTION

This invention relates generally to glass cutters, and deals more particularly with removable cutting wheel retainers for use in a holder of the type used in the cutting head of a machine for scoring glass sheet on a production basis. These wheels must be easily and rapidly removed for replacement or repair, and yet must be designed to withstand long periods of use without being subjected to excessive wear especially in the axle mounting means for the cutting wheel.

In accordance with the present invention, the cutting wheel is provided on a relatively long axle, which axle is held in a U-shaped spring clip or retainer to permit easy removal, and which axle is also supported in a slot defined by the holder itself which carries the retainer. More particularly, the holder has a cross-slot oriented perpendicularly to the slot for the retainer in order to receive the axle therein, and spaced pins extend across the axle slot for engaging the ends, or end portions of the axle, and as a result the axle and retainer are supported by the cross-axle and pins to provide a very rugged precision glass cutter which will nevertheless permit easly removal for replacement or repair of the cutting wheel and its associated retainer.

BRIEF DESCRIPTION OF THE DRAWINGS

FIG. 1 is a side elevational view of a pillar post of the type adapted to be mounted in a glass cutting machine having a head which is adapted to traverse a glass sheet to be scored, the pillar post having an improved holder and associated cutting wheel retaining clip mounted therein in accordance with a preferred embodiment of the invention.

FIG. 2 is a sectional view taken generally on the line 2—2 of FIG. 1.

FIG. 3 is a bottom view of the embodiment illustrated in FIGS. 1 and 2.

FIG. 4 is an elevational view of the retaining clip and its associated cutting wheel as illustrated in FIGS. 1, 2 and 3.

FIG. 5 is a front elevational view of the cutting wheel and retainer illustrated in FIG. 4.

FIG. 6 is a side elevational view of an alternative embodiment of the present invention.

FIG. 7 is a sectional view taken generally on the line 7—7 of FIG. 6.

FIG. 8 is a front elevational view of the embodiment illustrated in FIGS. 6 and 7.

FIG. 9 is a perspective view of the cutting wheel and its associated retainer as utilized in the embodiment of FIGS. 6, 7 and 8.

FIG. 10 is a plan view of the retainer and associated cutting wheel illustrated in FIG. 9.

FIG. 11 is a side elevational view of the cutting wheel and retainer illustrated in FIGS. 9 and 10.

DETAILED DESCRIPTION OF THE PREFERRED EMBODIMENT ILLUSTRATED IN FIGS. 1-5 INCLUSIVELY

Turning now to the first sheet of drawings in greater detail, FIG. 1 shows a pillar post 10 of the type adapted to be mounted in the head of glass cutting machine so as to be adapted to score a glass sheet (not shown) in the direction of the arrow 12. A holder 14 is provided at the lower end of the pillar post 10, said holder being bifurcated as best shown in FIG. 2 so as to define a downwardly open slot 14c between its furcations 14a and 14b. The slot 14c is also open forwardly, as best shown in FIG. 1, and preferably extends through the holder 14. A U-shaped retainer 6 is mounted in the slot 42c, and as best shown in FIG. 2, the upper portion of the retainer 16 is adapted to abut, and be supported by the upper boundary of the slot 14c.

The holder 14 also defines a cross-slot 14d in which an elongated axle 20 of the cutting tool is received, and it is a feature of the present invention that the cross axle slot 14d is oriented at right angles to the downwardly open retainer slot 14c. The cross axle slot 14d is preferably of rectangular configuration, as best shown in FIG. 1, and it is a further feature of the present invention that depending pins 22, 22 are provided in the holder, and extend across the axle slot 14d in order to cooperate with the sides of the axle slot to hold the axle therebetween. Thus, the pins 22, 22 restrain the axle against movement in its associated slot 14d, and more particularly cooperate with the retainer slot 14c to prevent lateral movement of the axle 20, and the cutting wheel, during use of the device in scoring a glass sheet.

Turning next to a more complete description of the U-shaped retainer 16, FIGS. 4 and 5 show this element of the improved glass cutter illustrated in FIG. 1 in greater detail. As shown in FIG. 5, the legs 16a and 16b of the retainer are spread apart slightly in their unstressed configuration, as assembled with the wheel, so that they must be compressed for insertion of the retainer in its associated slot 14c of the holder as shown in FIG. 2. The legs 16a and 16b of the retainer 16 define aligned axial openings 16c and 16d respectively, one of which openings is of substantially the same diameter as the axle 20, and the other of such leg openings being somewhat larger to permit the spreading of the legs as illustrated in FIG. 5. In the spread configuration of FIG. 5 the wheel and axle are held in convenient subassembly form. When the legs are moved toward one another, that is into parallel relationship with one another, the retainer can be located in the slot 14c of the holder, with the result that the projecting end portions of the axle engage the upper, or inner boundary, of the cross axle slot 14d and support the axle in such a manner as to efficiently react the normal forces imposed upon the cutting wheel during the scoring operation. The axle 20 is of such a length that end portions thereof project laterally outwardly beyond the sides of the legs of the associated retainer (as assembled) by a distance approximately equal to the diameter of the axle itself.

DETAILED DESCRIPTION OF THE SECOND PREFERRED EMBODIMENT ILLUSTRATED IN FIGS. 6-11 INCLUSIVELY

Turning now to the second sheet of drawings in greater detail, FIG. 6 shows a pillar post 11 of the type adapted to be mounted in the head of a glass cutting machine such that the pillar post can be moved across the glass sheet to be scored in the direction indicated by the arrow 12 in FIG. 6. A bifurcated holder 24 is defined at the lower end of the post 11 and defines a downwardly open slot 14c between its furcations 24a and 24b. A cross axle slot 24d is defined in the holder 24 and is oriented perpendicularly with respect to the slot 24c to receive the end portions of the axle 30 provided in a U-shaped spring clip retainer 26, best shown in FIG. 9. As with the previous embodiment, the retainer slot 24c extends forwardly and rearwardly through the holder 24, and the U-shaped retainer 26 in the FIG. 6 embodiment is adapted to be received rearwardly into the slot 24c, rather than upwardly into the slot as is the case with the retainer 16 of FIG. 1. The cross axle slot 24d also extends forwardly and rearwardly through the holder, but stops short of the sides of the furcations. This axle slot is provided with downwardly extending pins 32, 32 which engage the end portions of the axle 30 as best shown in FIG. 7 so that the axle is securely held in this cross axle slot 24d. As so constructed and arranged, these pins 32, 32 restrain the axle 30 from movement in the axle slot 24d, and these pins, like the pins shown in the previous embodiment, are oriented normally to the glass sheet being cut (that is parallel to the plane of the glass scoring wheel).

Still with reference to the holder 24 a bore 25 is provided in one of the furcations 24a so as to receive a tang 27, provided for this purpose on one of the leg portions of the U-shaped retainer 26. This tang 27 engages the inner end of the bore 25 which bore opens into the retainer slot 24c so as to retain the spring clip retainer in its slot 24c, and to hold the retainer and scoring wheel, together with its associated axle 30, in engagement with the pins 32, 32 mentioned previously.

T rning next to a more detailed description of the retainer 26, FIG. 9 shows the U-shaped retainer as including leg portions 26a and 26b, each of which leg portions defines an opening adapted to receive the axle 30 as best shown in FIG. 10. As in the previously described embodiment, one of these openings is somewhat larger than the other, the smaller of the two being sized to receive the axle 30. Unlike the U-shaped retainer 26 of FIG. 4, the retainer 26 of FIG. 9 has the base of the U provided at the rear, or trailing side of the holder 24, and the upper side edges or the legs 26a and 26b are adapted to engage the inner boundary of the retainer slot 24c in this version. The tang 27 for engaging the bore 25 is illustrated in FIGS. 9, 10 and 11 on the leg portion 26a of the retainer 26. The retainer 26 further includes forwardly and outwardly bent finger engageable abutments 26c and 26d respectively which facilitate the removal for replacement or repair of the retainer and its associated cutting wheel. The cutting wheel 36 is generally similar to that illustrated in the previous embodiment and is adapted to rotate on the axle 30, with the axle being securely held in the holder as described above by reason of the cross axle slot 24b and the associated pins 32, 32 described previously.

I claim:

1. A glass cutter, for use in a glass cutting machine having a head adapted to traverse a glass sheet in at least a forward direction, and comprising:
   (a) a bifurcated holder member fixed in the head and having furcations defining a downwardly open retainer slot therebetween,
   (b) a generally U-shaped retainer formed from a resilient material and having the legs of the U provided with aligned axle openings one of which openings is slightly larger than the other and said retainer having an unstressed configuration such that the legs are spread slightly so that said retainer legs are adapted to being moved toward one another and into parallel relationship with one another when said retainer is located in said slot in said holder member,
   (c) an elongated axle having a diameter at least approximately equal to the diameter of the smaller of said leg openings, and said axle having end portions projecting outwardly beyond said legs of said U-shaped retainer a distance at least approximately equal to the diameter of said axle, and a glass scoring wheel on said axle and between said retainer legs,
   (d) said holder member having a cross slot for receiving said axle, said cross slot oriented at right angles to said downwardly open slot for said retainer, and
   (e) spaced pins in said holder furcations extending across said cross axle slot for engaging said axle end portions and restraining said axle against movement in its slot and so that said axle end portions bear against the inner wall of said cross axle slot while the head traverses the glass sheet.

2. A glass cutter as set forth in claim 1 wherein said cross axle slot is downwardly open and wherein said U-shaped retainer is received upwardly in said downwardly open retainer slot.

3. A glass cutter as set forth in claim 1 wherein said cross axle slot is rearwardly open and wherein said U-shaped retainer is received rearwardly in said downwardly open retainer slot, said downwardly open slot also being open forwardly to so receive said retainer, and a tang on at least one of said retainer legs for releasably engaging a cavity in one of said furcations to hold said retainer in said downwardly open retainer slot.

4. A glass cutter for use in a glass cutting machine having a head adapted to traverse a glass sheet in at least a forward direction, and comprising:
   (a) a bifurcated holder member fixed in the head and having furcations defining a downwardly open retainer slot therebetween,
   (b) a U-shaped retainer formed from a resilient material and having the legs of the U provided with aligned axle openings one of which openings is slightly larger than the other, and said retainer having an unstressed configuration such that the legs are spread slightly so that said retainer legs are adapted to being moved toward one another and in parallel relationship with one another when said retainer is located in said slot in said holder member, (c) an elongated axle having a diameter at least approximately equal to the diameter of the smaller of said axle openings in said legs, and said axle having end portions projecting outwardly beyond said legs of said U-shaped retainer a distance at least approximately equal to the diameter of said axle, and a glass scoring wheel on said axle between said retainer legs, (d) said holder member having an axle slot oriented at right angles to said retainer slot and also open downwardly to receive the axle when said retainer slot receives said retainer, (e) pins mounted in said holder furcations and extending downwardly across said axle slot for engaging the ends of said axle and restraining said axle from movement in said axle slot, said pins being oriented parallel to said legs of said retainer and to said scoring wheel.

5. A glass cutter as set forth in claim 4 wherein said U-shaped retainer has an upper end opposite the axle opening defining ends thereof, said upper end abutting the upper boundary of said downwardly open retainer slot to at least partially support said retainer and wheel for scoring the glass, and said pins preventing said axle from movement laterally with respect to said retainer slot, said axle slot having an upper boundary engaging the axle end portions to support said axle and wheel for scoring the glass.

6. A glass cutter for use in a glass cutting machine having a head adapted to traverse a glass sheet in at least a forward direction, and comprising:
(a) a bifurcated holder member fixed in the head and having furcations defining a downwardly and forwardly open retainer slot therebetween,
(b) A U-shaped retainer formed from a resilient material and having the legs of the U provided with aligned axle openings one of which openings is slightly larger than the other, and said retainer having an unstressed configuration such that the legs are spread slightly so that said retainer legs are adapted to being moved toward one another and in parallel relationship with one another when said retainer is located in said slot in said holder member,
(c) an elongated axle having a diameter at least approximately equal to the diameter of the smaller of said axle openings in said legs, and said axle having end portions projecting outwardly beyond said legs of said U-shaped retainer a distance at least approximately equal to the diameter of said axle, and a glass scoring wheel on said axle between said retainer legs,
(d) said holder member having an axle slot oriented at right angles to said retainer slot and also open forwardly to receive the axle when said retainer is inserted rearwardly into said retainer slot,
(e) pins mounted in said holder furcations and extending downwardly across said axle slot for engaging the end portions of said axle to restrain said axle against movement in said axle slot, said pins oriented parallel said scoring wheel and perpendicular to said retainer legs.

7. A glass cutter as set forth in claim 6 wherein said retainer slot is also rearwardly open, said U-shaped retainer received rearwardly in said downwardly and forwardly open slot, and said pins engaging said axle end portions to restrict movement of said retainer rearwardly.

8. A glass cutter as set forth in claim 7 wherein said retainer has a projecting tang defined adjacent one end of its legs for releasably engaging a cavity in one of said holder member furcations to hold said retainer against forward movement in said retainer slot, said retainer having one side of each leg engaging the upper boundary of said downwardly open retainer slot to at least partially support said retainer and cutter wheel for scoring the glass.

9. A glass cutter as set forth in claim 8 wherein said cross axle slot is not open laterally to the sides of said furcations.

10. A glass cutter as set forth in claim 9 wherein said retainer legs have forwardly projecting portions which are bent back around said furcations to afford easy manual squeezing and withdrawal of the retainer.

* * * * *